(12) United States Patent
Deck

(10) Patent No.: US 10,890,428 B2
(45) Date of Patent: Jan. 12, 2021

(54) INTERFEROMETRIC METHOD AND APPARATUS USING CALIBRATION INFORMATION RELATING A FOCUS SETTING TO A TEST OBJECT POSITION

(71) Applicant: Zygo Corporation, Middlefield, CT (US)

(72) Inventor: Leslie L. Deck, Middletown, CT (US)

(73) Assignee: Zygo Corporation, Middlefield, CT (US)

( * ) Notice: Subject to any disclaimer, the term of this patent is extended or adjusted under 35 U.S.C. 154(b) by 0 days.

(21) Appl. No.: 15/806,615

(22) Filed: Nov. 8, 2017

(65) Prior Publication Data
US 2018/0143002 A1 May 24, 2018

Related U.S. Application Data

(60) Provisional application No. 62/423,856, filed on Nov. 18, 2016.

(51) Int. Cl.
*G01B 9/02* (2006.01)
(52) U.S. Cl.
CPC ................ *G01B 9/02072* (2013.04)
(58) Field of Classification Search
CPC .............. G01B 9/02072; G01N 21/45; G01N 2021/7779
See application file for complete search history.

(56) References Cited

U.S. PATENT DOCUMENTS

| 5,402,234 A | * | 3/1995 | Deck .................. G01B 9/04 356/497 |
| 6,285,456 B1 | | 9/2001 | Narumi |
| 6,882,432 B2 | | 4/2005 | Deck |
| 2003/0160968 A1 | | 8/2003 | Deck |
| 2005/0030550 A1 | | 2/2005 | Nahum |
| 2006/0082783 A1 | | 4/2006 | Ishizuka |
| 2006/0114475 A1 | * | 6/2006 | De Groot ............ G01B 9/0209 356/497 |
| 2006/0221350 A1 | | 10/2006 | Murphy et al. |

(Continued)

FOREIGN PATENT DOCUMENTS

| CN | 1254088 | 5/2000 | ............... G01B 9/02 |
| CN | 1611915 | 5/2005 | ............... G01B 9/02 |

(Continued)

OTHER PUBLICATIONS

Karsenty et al. Manipulations of Wavefront Propagation: Useful Methods and Applications for Interferometric Measurements and Scanning. Hindawi Scanning vol. 2017, Article ID 7292905, Aug. 21, 2017. (Year: 2017).*

(Continued)

*Primary Examiner* — Hwa Andrew Lee
(74) *Attorney, Agent, or Firm* — Fish & Richardson P.C.

(57) ABSTRACT

A method for measuring a property of a test object with an interferometer includes: a) providing calibration information relating a focus setting for the interferometer to a position of the test object relative to a reference surface of the interferometer; b) determining the position of the test object relative to the reference surface; and c) using the interferometer to collect interferometric images of the test object for use in measuring the property of the test object.

20 Claims, 10 Drawing Sheets

(56) References Cited

U.S. PATENT DOCUMENTS

| | | |
|---|---|---|
| 2006/0224350 A1 | 10/2006 | Tanizawa |
| 2013/0155413 A1 | 6/2013 | Liesener et al. |
| 2013/0265585 A1 | 10/2013 | Fang-Yen et al. |
| 2015/0192769 A1 | 7/2015 | Dresel et al. |
| 2016/0216501 A1 | 7/2016 | Cable et al. |
| 2017/0191821 A1 | 7/2017 | Deck |

FOREIGN PATENT DOCUMENTS

| | | | |
|---|---|---|---|
| CN | 1760633 | 4/2006 | ............... G01B 9/02 |
| CN | 1784588 | 6/2006 | ............... G01B 9/02 |
| CN | 101268331 | 9/2008 | ............. G01B 11/24 |
| CN | 102057269 | 5/2011 | ............. G01N 21/45 |
| CN | 106030241 | 10/2016 | ............. G01B 11/24 |
| CN | 107407798 | 11/2017 | ............. G02B 21/00 |
| JP | 2009-053066 | 3/2009 | ............... G01B 9/02 |
| WO | WO 03/050470 | 6/2003 | |
| WO | WO 2004/079294 | 9/2004 | ............... G01B 9/02 |
| WO | WO 2017/116787 | 7/2017 | ............. G01N 21/45 |

OTHER PUBLICATIONS

PCT Transmittal of the International Search Report and Written Opinion of the International Searching Authority dated Feb. 6, 2018 (20 pages).

U.S. Appl. No. 62/273,972, filed Dec. 31, 2015.

De Groot, "Phase Shifting Interferometry", *Optical Measurement of Surface Topography*, Edited by R. Leach, Chapter 8, pp. 167-186 (Springer Verlag, Berlin, 2011).

De Groot, "Holography Just a fancy name for Interferometry?" *Digital Holography& 3-D Imaging*, Heidelberg, Monday, Jul. 25, 2016 (17 pages).

Deck et al., "Fourier-transform phase-shifting interferometry", *Applied Optics*, vol. 42, No. 13, pp. 2354-2365 (May 1, 2003).

L. Deck, "Modern high precision interferometric testing of optical components", *icOPEN Chengdu*, (Sep. 2016 ) (35 pages).

Deck, "Model-based phase shifting interferometry", *Applied Optics*, vol. 53, No. 21, pp. 4628-4636 (Jul. 20, 2014).

Goodman, "Introduction to Fourier Optics", 2nd Edition, The McGraw-Hill Companies. Publisher (1996) (457 pages).

Osten et al., "Recent advances in digital holography[Invited]", Applied Optics, vol. 53, No. 27, pp. G44-G63 (Sep. 20, 2014).

Sziklas et al., "Diffraction Calculations using Fast Fourier Transform Methods", *Proceedings of the IEEE*, pp. 410-412 (Mar. 1974).

The International Preliminary Report on Patentability for International Application No. PCT/US2017/060623 dated May 31, 2019.

The Chinese Office Action for Chinese Application No. CN 201780071464.3 dated Jul. 28, 2020 (with English Translation.

Baer, G., et al., "Automated surface positioning for a non-null test interferometer", *Optical Engineering*, vol. 49, No. 9, pp. 095602-1-095602-12 (Sep. 2010).

The Supplementary European Search Report for European Application No. EP 17 87 1737, dated Jun. 23, 2020.

Baer, G. et al., "Automated surface positioning for a non-null test interferometer", *Optical Engineering*, vol. 49, No. 9, pp. 95602-1-95602-12 (Sep. 15, 2010).

Zhang, L. et al., "Practical and accurate method for aspheric misalignment aberrations calibration in non-null interferometric testing", *Applied Optics*, vol. 52, No. 35, pp. 8501-8511 (Dec. 10, 2013).

\* cited by examiner

INTERFEROMETRIC METHOD AND APPARATUS USING CALIBRATION INFORMATION RELATING A FOCUS SETTING TO A TEST OBJECT POSITION

CROSS REFERENCE TO RELATED APPLICATION

This application claims priority to U.S. Provisional Patent Application No. 62/423,856, filed on Nov. 18, 2016, pursuant to 35 USC § 119. The entire content of this provisional application is herein incorporated by reference in its entirety.

BACKGROUND

Interferometry for optical wavefront and surface topography measurements is and has been a popular technique for high-precision measurements due to its ease of use, performance and versatility. Phase shifting interferometry ("PSI") is one interferometry technique. PSI involves precisely moving one of the surfaces of the cavity (typically the reference surface) using, for example, piezo-electric transducers (PZTs) while observing the cavity interference on a camera which is focused on the test surface. Analyzing the changes in the interference pattern allows one to calculate the complex optical field related to the difference between the test and reference surfaces. If the reference surface form is known, the test surface form can be extracted from the measured field to high precision. Focusing is typically performed manually, with the operator adjusting focus until surface features or edges are visually sharpest. If surface features are absent, however, accurate visual focusing becomes difficult so users often resort to other methods, such as placing a soft nonreflecting surface with a sharp edge (like paper) in contact with the test surface to act as a surrogate feature to focus on.

Early instruments used relatively low density imagers (i.e. VGA density, 320×240 or 640×480 pixels) because higher density imagers were either not available or too expensive at the time. The measureable spatial frequencies obtained with these imagers were modest so visual focusing was adequate. Modern instruments routinely use high density imaging formats with 1 Mpix to 4 Mpix cameras routine and larger formats (25 Mpix) being considered.

SUMMARY

It has been recognized that the high density imaging formats typical of modern interferometry instruments can achieve spatial resolutions that far exceed the ability of a user to visually discern, and therefore, the fact that visual focusing is still employed means that these instruments are rarely operated at best focus, which can undermine optical performance.

What is required is an interactive or automated way to focus the instrument or compensate for a defocused condition that is superior to visual interpretation of the live image of an interference pattern. To address this need, embodiments herein provide methods and apparatus to measure and correct for instrument focus so as to optimize the quality of surface topography or wavefront maps generated interferometrically.

In general, in one aspect, a method for measuring a property of a test object with an interferometer is disclosed. The method includes: a) providing calibration information relating a focus setting for the interferometer to a position of the test object relative to a reference surface of the interferometer; b) determining the position of the test object relative to the reference surface; and c) using the interferometer to collect interferometric images of the test object for use in measuring the property of the test object. For example, the focus setting may be a position of best-focus for an image of the object produced by the interferometer. The method further includes at least one of the following: i) prior to collecting at least some of the interferometric images, adjusting a focus of the interferometer in hardware based on the calibration information and the determined position of the test object relative to the reference surface to improve a degree of focus of the interferometric images; and ii) using one or more electronic processors to mathematically propagate at least one wavefront derived from the interferometric images based on the calibration information and the determined position of the test object relative to the reference surface to improve a degree of focus of the wavefront derived from the interferometric images.

Embodiments of the method may include any of the following features.

The interferometer may include a ruled stage for supporting the test object and wherein determining the position of the test object relative to the reference surface comprises manually or automatically reading the ruled stage. Alternatively, or in addition, the interferometer includes a light source having a variable wavelength, wherein the interferometric images are collected while adjusting the wavelength of the light source, and wherein the position of the test object relative to the reference is determined based on the interferometric images collected while adjusting the wavelength of the light source.

The method may include adjusting of the interferometer in hardware to improve the degree of focus of the interferometric images, and wherein the adjustment includes a mechanical, optical, or electro-optical adjustment to the focus of the interferometer to improve the degree of focus of the interferometric images. For example, the interferometer may include a detector used to detect the interferometric images, and wherein the adjustment includes an adjustment to a position of the detector or an adjustment to focus optic upstream of the detector. Alternatively, or in addition, the method may include the mathematical propagation of the wavefront derived from the interferometric images based on the calibration information and the determined position of the test object relative to the reference to improve the focus of the wavefront, and wherein the measurement of the property of the test object is determined based on the propagated wavefront.

The measured property of the test object may include a surface topography, a thickness profile, or a material uniformity profile. For example, when the measured property of the test object includes a thickness profile or a material uniformity profile, and the method may further include mathematically propagating at least one other wavefront derived from the interferometric images.

The method may further include determining the calibration information. For example, determining the calibration information may include: a) using the interferometer to collect interferometric images of an artifact object having known surface features for each of different positions of the artifact object relative to the reference surface; and b) for each of the different positions of the artifact object, using one or more electronic processors to mathematically propagate a wavefront derived from the interferometric images to determine a position of best-focus for an image of the artifact object produced by the interferometer.

In general, in another aspect, an interferometric system for measuring a property of a test object is disclosed. The system includes: a) an interferometer for collecting interferometric images of the test object; and b) one or more electronic processors coupled to the interferometer for analyzing the collected interferometric images, wherein the one or more electronic processors are configured to store calibration information relating a focus setting for the interferometer to the position of the test object relative to a reference surface of the interferometer. For example, the focus setting may be a position of best-focus for an image of the object produced by the interferometer. The one or more electronic processors are configured to do at least one of the following: i) prior to collecting at least some of the interferometric images, cause an adjustment to hardware of the interferometer to improve a degree of focus of the interferometric images based on the calibration information and information for the position of the test object relative to the reference surface; and ii) mathematically propagate at least one wavefront derived from the interferometric images based on the calibration information and the information for the position of the test object relative to the reference surface to improve a focus of the wavefront derived from the interferometric images.

Embodiments of the system, may including any of the following features.

The interferometer may include a ruled stage for supporting the test object and a reader for reading the position of the test object relative to the reference surface, and wherein the reader provides the information for the position of the test object relative to the reference surface to the one or more electronic processors. Alternatively, or in addition, the interferometer may include a light source having a variable wavelength, wherein the interferometer is configured to collect the interferometric images while adjusting the wavelength of the light source, and wherein the one or more electronic processors are configured to determine the information for the position of the test object relative to the reference surface based on the interferometric images collected while adjusting the wavelength of the light source.

The electronic processors may be configured to cause the adjustment to hardware of the interferometer to improve the focus of the interferometric images based on the calibration information and the information for the position of the test object relative to the reference surface, and wherein the hardware adjustment comprises a mechanical, optical, or electro-optical adjustment to the reference surface to improve the degree of focus of the interferometric images. For example, the interferometer may include a detector used to detect the interferometric images, and wherein the hardware adjustment includes an adjustment to a position of the detector. Alternatively, or in addition, the one or more electronic processors may be configured to mathematically propagate the at least one wavefront derived from the interferometric images based on the calibration information and the information for the position of the test object relative to the reference surface to improve the degree of focus of the wavefront derived from the interferometric images, and wherein the one or more electronic processors are further configured to determine the property of the test object based on the propagated wavefront.

The measured property of the test object may include a surface topography, a thickness profile, or a material uniformity profile. For example, when the measured property of the test object is a thickness profile or a material uniformity profile, and the one or more electronic processor may be further configured to mathematically propagate at least one other wavefront derived from the interferometric images.

In general, in yet another aspect, an interferometric system for measuring a property of a test object is disclosed. For example, the measured property may include a surface topography, a thickness profile, or a material uniformity profile. The system includes: a) an interferometer for collecting interferometric images of the test object; and b) one or more electronic processors coupled to the interferometer for analyzing the collected interferometric images. The interferometer includes a light source having a variable wavelength, and is configured to collect the interferometric images while adjusting the wavelength of the light source. Furthermore, the one or more electronic processors are configured to determine information for a position of the test object relative to a reference surface of the interferometer based on the interferometric images collected while adjusting the wavelength of the light source. The one or more electronic processors are further configured to mathematically propagate at least one wavefront derived from the interferometric images based on the determined information for the position of the test object relative to the reference surface to improve a degree of focus of the wavefront derived from the interferometric images.

Embodiments of the system, may including any of the following features, in addition to those described above for the prior system.

The one or more electronic processors may be further configured to determine the property of the test object based on the propagated wavefront.

The one or more electronic processors may be configured to mathematically propagate the at least one wavefront derived from the interferometric images based on the information for the position of the test object relative to the reference surface and calibration information relating a focus setting for the interferometer to the position of the test object relative to the reference surface.

As used herein, "camera" and "detector" and "imager" are used interchangeably to refer to a device for recording images, including interferometric images, of the test object, and include, without limitation, charge-coupled device ("CCD") detectors, complementary metal oxide semiconductor ("CMOS") detectors, micro bolometer detectors, and other such detectors.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
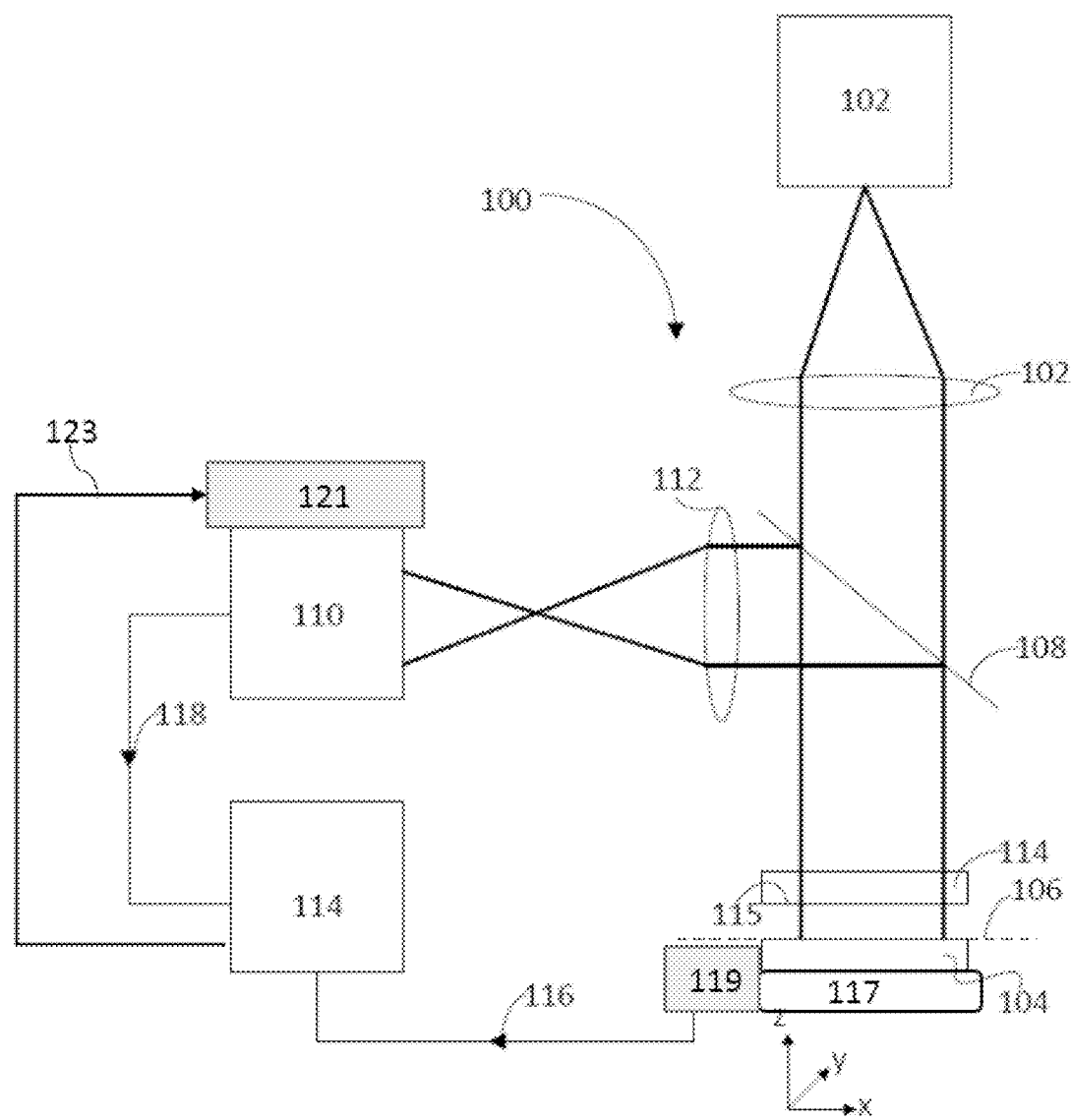
FIG. 1 is a schematic diagram of an interferometry system.

Disclosed herein is an interferometer to measure surface topography, form or texture or optical wavefront, which includes means for determining the position of the object under test using a distance-measuring system, and automatically or interactively adjusting the optical focusing properties of the interferometer to optimize the quality and resolution of the final topographical image. Methods for using the interferometer are also disclosed.

In certain embodiments of a method for using the interferometer, the optimization of the final topographical image includes the following three steps: i) initial calibration to determine the proper focus setting relative to a reference position as a function of test object position; ii) determining the position of the test object surface relative to the reference position by a distance measurement system; and iii) adjustment of the instrument either in hardware or in software to bring the test object surface into best focus.

Generally, the reference position corresponds to a surface with very low spatial frequency content, such as the reference flat in a typical interferometer.

An artifact or other part with well-known surface features can be used to setup and calibrate the focus mechanism. This is in contrast to test samples that have surface height variations of interest but are otherwise featureless with respect to determining an optimal focus position. This calibration can be done just once, periodically, or prior to every measurement.

In some embodiments, the distance-measuring system can be a simple mechanical system such as a ruler on the test object stage to mark the position of the test object surface relative to the reference surface. The ruler can be read directly by the user, or an automated optical reader can be used to provide the information about the position of the test object surface to an electronic controller for operating the interferometry system. In yet further embodiments, rather than a simple ruler, the position of the test object on the test object surface relative to the reference position can be read from an encoder scale using an optical reader.

Moreover, in some embodiments, the distance measurement of the test object surface relative to the reference surface can be determined by analyzing interferometry data acquired while adjusting the wavelength of the light source. In such embodiments, the distance-measuring system is part of the overall data analysis system for the wavelength-scanning interferometry system, as described further below. Furthermore, in such embodiments, the object under test can include multiple surfaces (such as, for example, the front and back surfaces of a sample), and the data analysis system can determine the location of each of the multiple surfaces of the test object relative to the reference surface so as to selectively focus on one or more surfaces and/or correct for defocus.

Generally, the desired accuracy for the distance measurements is at least on the order of the depth of focus of the imaging system used to image the object under test to the camera, which for many implementations, is on the order of hundreds of microns, or even millimeters in object space.

Where the correction of the focus position is implemented in hardware, embodiments can include any of mechanical, optical, or electro-optical means for adjusting the focus of the test object. For example, an automated mechanical stage that supports the camera can be used to adjust the position of the camera based on the distance measurement so that the test object surface is in focus. In yet further examples, the positions and/or powers of one or more optical elements for imaging the test object to the detector can be adjusted to better focus the test surface onto the camera.

Where the correction of the focus position is implemented in software, an electronic processing system for analyzing the interferometry images extracts a wavefront corresponding to a cavity formed by each test surface of interest and the reference surface and digitally propagates that wavefront to a position of better focus based on the distance measurements.

After improving the focus position for the interferometric images collected by the camera, the system can determine information about the test object with greater accuracy, including information such as a surface height profile, a thickness profile, and/or a material uniformity profile.

Exemplary Interferometry System

FIG. 1 shows an embodiment that includes a Fizeau interferometer 100. The Fizeau interferometer 100 includes a light source 102. The light source 102 can be a laser source, such as a helium-neon (HeNe) laser emitting light having a wavelength $\lambda$ of 633 nm. An optical element 102 (only a single element is illustrated in FIG. 1), schematically depicted as a lens can be used to collimate light emitted from the source 102. A portion of the light is transmitted through a beamsplitter 108 before it strikes a partially-transparent reference optical element 114 having a partially-transparent back reference surface 115. The partially-transparent reference surface 115 divides light into a reference beam and a measurement beam. The measurement beam is transmitted through the back reference surface 115 and propagates to an object of interest 104, the front surface of which is located in a plane 106. During calibration (as described in further detail below), the object of interest 104 can be an artifact that contains one or more surface features (not illustrated in FIG. 1) having known characteristics. These characteristics can include a height of a feature, a linewidth of the feature, and/or a spacing between features.

The measurement beam and reference beam are reflected by the beamsplitter 108 and imaged by an optical element 112 (shown as a single element in FIG. 1) onto the detector 110. Light reflected from the front surface of the artifact 104 is combined with the reference light reflected off the back surface 115 of the reference optical element 114 at a detector 110 which images the resulting interference pattern electronically. The detector 110 can be a two-dimensional detector like a CCD camera having a two-dimensional array of pixels. Carrier fringe interferometry is one type of instrument the methods and apparatus described herein can be used. For example, in carrier fringe interferometry, the reflected measurement and reference beams are at an angle such that there are dense interference fringes at the detector 110. The number of fringes across the field is termed the carrier frequency, which can be very high—on the order of hundreds of fringes over the field of view (FOV) of the instrument. The FOV is the spatial extent observable by the instrument and can depend on the optical configuration. The FOV can usually be modified by, for example, adjusting the instrument "zoom". In the carrier fringe method, there is spatial encoding of phase information. Increasing zoom reduces the observable spatial extent but increases the sampling density—usually to resolve finer detail.

Other interferometer instruments, like systems which use Phase-Shifting techniques can be used. In the Phase-Shifting techniques, phase information is temporally changed to generate a sequence of interferogram frames. In general, the methods and apparatus described herein can be used in any interferometer, i.e. one that produces a topographical representation of the artifact surface.

Measurement data 118 recorded by the detector 110 is sent to an electronic processor 114. The measurement data 118 sent can include a detected interference pattern that is an electronic image-plane hologram of the object 104 from which a digital image of the reflected object wavefront can be computed using Fourier processing. Fourier processing broadly includes DFT, FFT, and other frequency transforms that convert spatially periodic features into spatial frequencies and vice-versa. The electronic processor 114 contains software that allows processing of these holograms to directly measure the phase of the wavefront, and to generate an electronic 3D image of the object surface. The electronic processor 114 can also receive information 116 from a positioning device 119 that reports at least a z-position of the test object 104 supported on stage 117. Positioning device 119 can be for example, optically, acoustically or mechanically based or use any other method that provides the positioning precision needed for the focusing application. For example, in one embodiment, positioning device 119 is an optical encoder system.

Furthermore, for embodiments in which the focus correction is implemented in hardware, the system can include an encoded, motorized focus mechanism 121 to move the camera 110 (or alternatively imaging optics) along the optical axis to bring the test surface into focus, based on information 123 from processor 114, which in turn is based on z-position information about test object 104.

Determining the Performance of a Focus Setting

Figure 2:
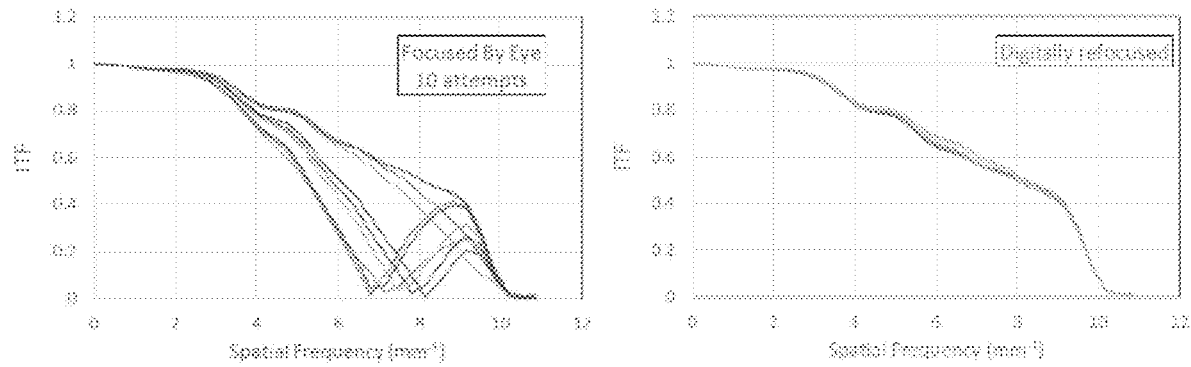
FIG. 2 are side-by-side graphs for the instrument transfer function ("ITF") for an imaging system focused by eye (left) versus digitally refocused (right) using a 4 MPix imager imaged over a 100 mm diameter field.

Methods to accurately assess the instrument transfer function ("ITF") of an interferometer through the measurement of a specially designed artifact are described in commonly owned U.S. provisional application Ser. No. 62/273,972 filed Dec. 31, 2015 and entitled "Method and Apparatus for Optimizing the Optical Performance of Interferometers," the contents of which are incorporated herein in its entirety. Such methods can be implemented herein to determine the optimum position for a stage for supporting the test object, by first measuring the degree of focus of the artifact supported by the stage. The artifact can contain phase or intensity features. Specifically, the above-referenced provisional application describes how to process the complex wavefront obtained from a PSI (phase shifting interferometry) measurement of the artifact to determine the distance to the plane of best focus by maximizing a metric approximately based on the Strehl ratio derived from the measured surface features of the artifact after optical propagation of the measured complex field—a process referred to herein as "focus processing." FIG. 2 shows the importance of correctly focusing on the surface under test. Specifically, FIG. 2 compares the ITF performance of an interferometry system at different spatial frequencies based on both purely visual focusing (graph on left) versus digitally refocusing (graph on right), such as described herein and in the above-referenced provisional application.

Commercial interferometers currently manufactured for optical metrology employ visual focusing methods to set focus. As illustrated in FIG. 2, visual focusing is inadequate as new higher density imagers are incorporated into interferometers to increase lateral resolution. Embodiments described herein, such as the interferometer in FIG. 1 and its operation, describe methods and systems to automatically and optimally focus these instruments.

Based on the interference images recorded by camera 110, the electronic processor extracts a "complex field" for the cavity formed by the reference surface of the reference flat 114 and the front surface of the test object 104, where the complex field is a function of lateral coordinates (e.g., x- and y-coordinates) of the test object. For example, for a phase shifting interferometry ("PSI") system, a sequence of N-images is recorded for N-different phase shifts. The phase-shifts, which are on the order of the optical wavelength and much, much less than the depth of focus of the optical imaging system, can be introduced by a piezo-electric transducer on the stage 117 supporting the test-object. In this case, the complex field is determined from a set of phase shifted frames acquired during a PSI acquisition as follows.

Let the complex coefficients for an N-frame PSI algorithm be $C_j$ where $j=0 \ldots N-1$. Various N-frame PSI algorithms are well-known in the art, see, for example, commonly owned U.S. Pat. Nos. 5,473,434 and 7,933,025, the contents of which are incorporated herein by reference in their entirety. Let the N measured intensities for pixel $_x$ be represented by $I_{x,j}$. The "complex field" $F_x$ is then represented by:

$$F_x = \sum_j C_j I_{x,j} = A_x \exp[i\varphi_x], \quad (1)$$

where the phase $\varphi_x$ for pixel $_x$ is determined via:

$$\varphi_x = \arg(F_x) = \mathrm{atan}\left(\frac{\mathrm{Im}[F_x]}{\mathrm{Re}[F_x]}\right) \quad (2)$$

and the amplitude $A_x$ with:

$$A_x = |F_x| = \sqrt{(Im[F_x])^2 + (Re[F_x])^2} \quad (3).$$

The relative intensity is $|F_x|^2 = A_x^2$.

To mathematically propagate an optical wavefront corresponding to a given cavity in software to improve focusing, it is this complex field $F_x$ that is propagated to a new Z' plane, becoming $F_x'$, from which a phase map with an improved focus can be extracted with $\varphi_x' = arg(F_x')$. Such "Optical Propagation" can be implemented using Fresnal propagation along the z-direction, such as is described in the textbook by J. Goodman, "Introduction to Fourier Optics", $3^{rd}$ Ed., Roberts and Co., (2005).

For example, the steps for a decomposition and reconstruction based on plane waves to propagate from $z_1$ to $z_2$ are;
  a. Fourier transform the complex wavefront at $z_1$, $U(x, y; z_1)$, to obtain the angular frequency spectrum $A(\alpha/\lambda, \beta/\lambda; z_1)$ where $\alpha$, $\beta$ are direction cosines along x, y
  b. Multiply the angular frequency spectrum by a propagation kernel $\exp(i2\pi/\lambda(z_2-z_1)\sqrt{1-\alpha^2-\beta^2})$, where $z_2-z_1$ represents the distance between the initial and propagated wavefront planes.
  c. Remove evanescent frequencies (zero those frequencies for which $\alpha^2+\beta^2>1$)
  d. Inverse Fourier transform to obtain the complex wavefront at the new plane $U(x, y; z_2)$ For spherical wavefronts the mathematical theory above is modified using the Sziklas coordinate transformation to account for the change in magnification during propagation. See, e.g., E. Sziklas & A. Siegman, "Diffraction Calculations using FFT methods," Proc. IEEE, 410-412, 1974. All z's are now measured relative to the beam waist position. Accordingly, for the propagation of a spherical wavefront from $z_1$ to $z_2$ the step are:
  a. The coordinates transform as $x_{1,2}' \to x_{1,2}/z_{1,2}$, $y_{1,2}' \to y_{1,2}/z_{1,2}$, and $$z_2' - z_1' = \frac{z_2 - z_1}{z_2 z_1}.$$

b. With these transformations the propagation proceeds identically to the plane wave sequence above.

To determine the performance of a given focus setting, the calibration artifact is measured by the interferometry system to determine the complex field. This complex field can be processed to extract a metric indicative of the ITF. Moreover, the complex field can be digitally propagated to other focus positions where the same metric is calculated. By comparing the results for different focus positions, the optimum focus position can be determined. U.S. provisional application Ser. No. 62/273,972 referenced above and incorporated by reference herein in its entirety describes various methods and techniques for calculating this focus performance metric. One example of such "focus processing" of a wavefront corresponding to a given cavity, includes the following steps as applied to the complex field for the wavefront and calibration artifact having a step edge:

1) Optical propagation to a new z-plane;
2) For each trace (a series of pixels centered about and perpendicular to a step edge of the calibration artifact) in the new z-plane;
  a. Extract the trace phase profile from the propagated field;
  b. Fit the profile to a step to determine the step height and phase tilt (i.e., sample tilt as whole);
  c. Normalize the trace by removing the phase tilt and dividing by the fit determined step height;
  d. Differentiate the normalized trace with respect to position (e.g., nearest neighbor differences) and apply a Fourier window (this minimizes error due to variation in the DC component);
  e. Circular shift the trace about its center (the position of the step);
  f. Inverse Fourier transform;
  g. Calculate the phase and amplitude at each frequency component;
  h. Calculate the phase slope with a weighted linear fit (the weights derived from the amplitudes);
  i. Remove phase slope to get the phase residual;
  j. Circular shift the trace about its center (this removes the shift in step 2.e); and
  k. Reconstruct the complex spectrum using the phase residual and the amplitude at each frequency. (Note that steps e-j digitally process the trace to make the step edge in the middle of the trace and normal to the optical axis)
3) Average all the complex trace spectra (note that averaging the complex values tends to reduce stochastic noise. The result is equivalent to the ITF due to the differentiation of step 2.d and normalization of step 2.c, assuming the artifact step is perfect)
4) Sum the spectral components of at least some part of the averaged spectrum
5) Repeat steps 1-4 for different focus planes until the sum in step 4 is maximized.

Once the best focus plane is found, the surface field is Fresnel propagated to this plane and steps 2 and 3 are used to calculate the final ITF.

Note that the sequence outline in step 2 is one possible sequence. Other sequences can also be used. In general, however, it is preferable that the outcome yields a phase detrended spectrum of the step. Specifically, it is important to account for misalignments of the step edge, relative to the imager sampling points.

This procedure does not require that the step height be known a-priori (it is measured in each trace). Since a lateral shift of the edge is equivalent to phase tilt in the Fourier domain, removing the phase tilt eliminates edge misalignment in each trace. Finally, averaging the complex trace spectra minimizes random fluctuations in the single trace Fourier amplitudes.

Figure 3:
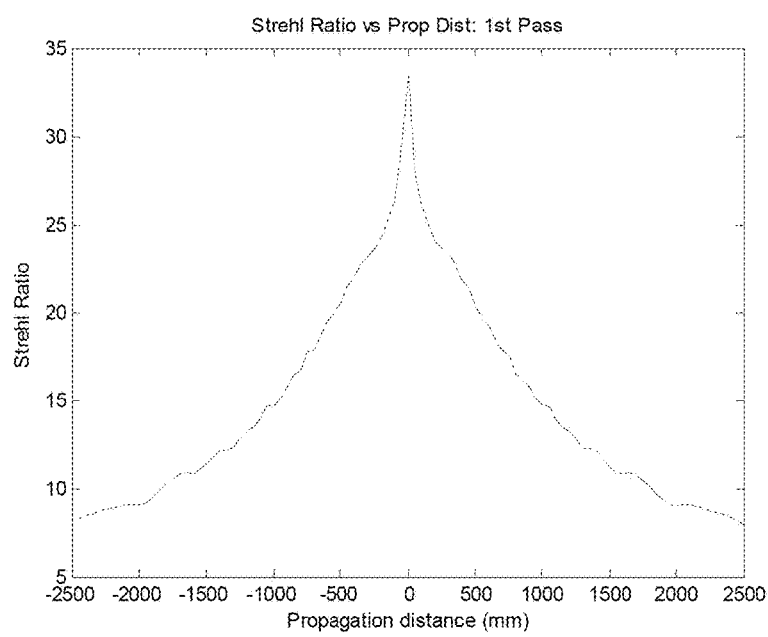
FIG. 3 is a graph of a focus metric (Strehl ratio) as a function of refocus position.

Using the sum of the spectral components as the focus metric is very effective and is loosely related to the Strehl ratio. FIG. 3 shows the value of this metric as a function of field propagation distance for a surface nominally in focus. The position of best focus is indicated by the position where the focus metric maximum occurs.

Focus Calibration for Exemplary Fizeau Interferometry System

Figure 4:
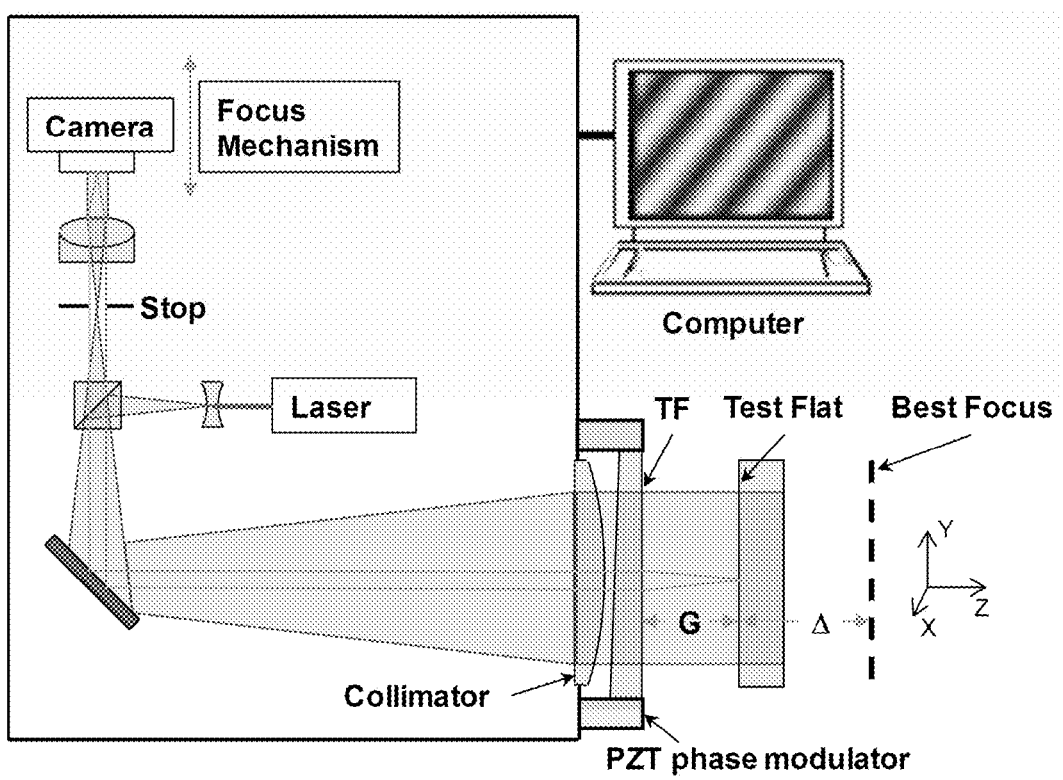
FIG. 4 is another rendering of the interferometry system in FIG. 1 for a typical Fizeau interferometer for measuring test optical flats. The TF-Test Flat cavity length is G.

FIG. 4 is another schematic rendering of an interferometer like interferometer 100 from FIG. 1. The interferometer is for measuring surface topography of test object flats ("Test Flat" in FIG. 4) and has a Fizeau geometry. The transmission flat ("TF" in FIG. 4) serves as the interference reference and the test flat is situated some distance away from the TF and aligned so interference fringes are produced at the camera. The interferometer also contains an encoded, motorized focus mechanism ("Focus Mechanism" in FIG. 4), which moves the camera (or alternatively the imaging optics) along the optical axis to bring the test surface into focus. A computer controls the measurement process, analyzes the data and calculates and presents results. The interferometer in FIG. 4 further includes piezo-electric transducer ("PZT phase modulator" in FIG. 4) for introducing phase shifts in the phase-shifted sequence of images recorded by the camera.

Referring to FIG. 4, assume the TF-Test surface cavity length (G) is known, then if the test flat contains surface features (either intensity or phase) with known characteristics, focus processing (as described above) of the PSI measured complex field can find the additional distance Δ from the test surface to the best focus plane in object space. It is convenient to measure the best focus position relative to the TF since the TF position is fixed in the system, and this is simply the sum of G and this propagation distance Δ. That object space position is optically conjugate to the position of the imager in image space. Thus these two conjugate positions can be determined. The focus processing just described occurred in object space, but at times it can be advantageous to perform this in image space, for example if the sampling in object space is poorly known.

Accordingly, this basic method requires knowledge of the cavity length G and the complex field describing the optical distribution in the cavity. However, the information about the cavity length can be determined a priori, determined from inspection of the z-position of the test object, and/or determined from the interferometric data itself, such as by using wavelength tuning (as described in further detail below). Similarly, the knowledge of the complex field describing the optical distribution in the cavity is extracted from the interference images recorded by the camera, including, for example, by processing a sequence of phase-shift interferometry images. Variations on this method are used to find focus, calibrate an encoded focus mechanism, and correct a defocused measurement.

Figure 5:
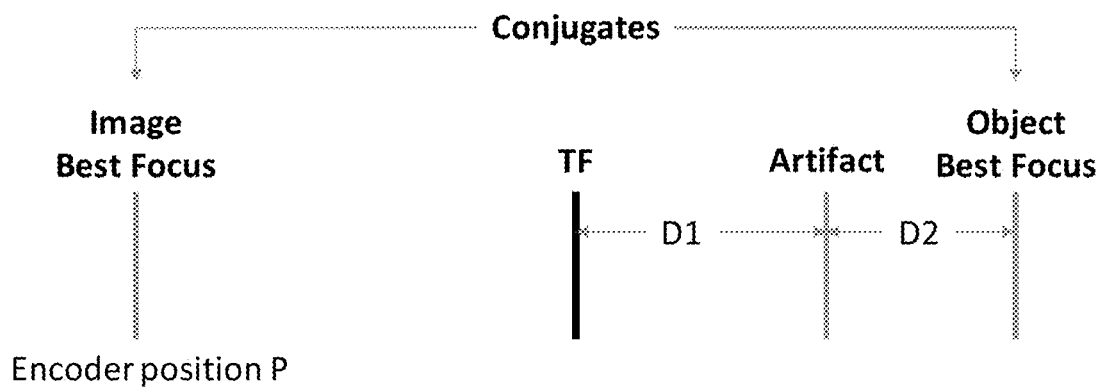
FIG. 5 is a schematic diagram illustrating calibration of the focus mechanism using object space processing.

Before a focus mechanism can be used, the Fizeau interferometer is calibrated to establish what image position corresponds to best focus for a particular object position. This calibration can be performed in either image or object space. FIG. 5 illustrates calibration in object space using a calibration artifact. Because the collimator is situated just to the left of the TF and the TF is fixed to the Fizeau interferometer, the TF serves as a convenient image/object space boundary; to the left is image space, to the right is object space.

Figure 6:
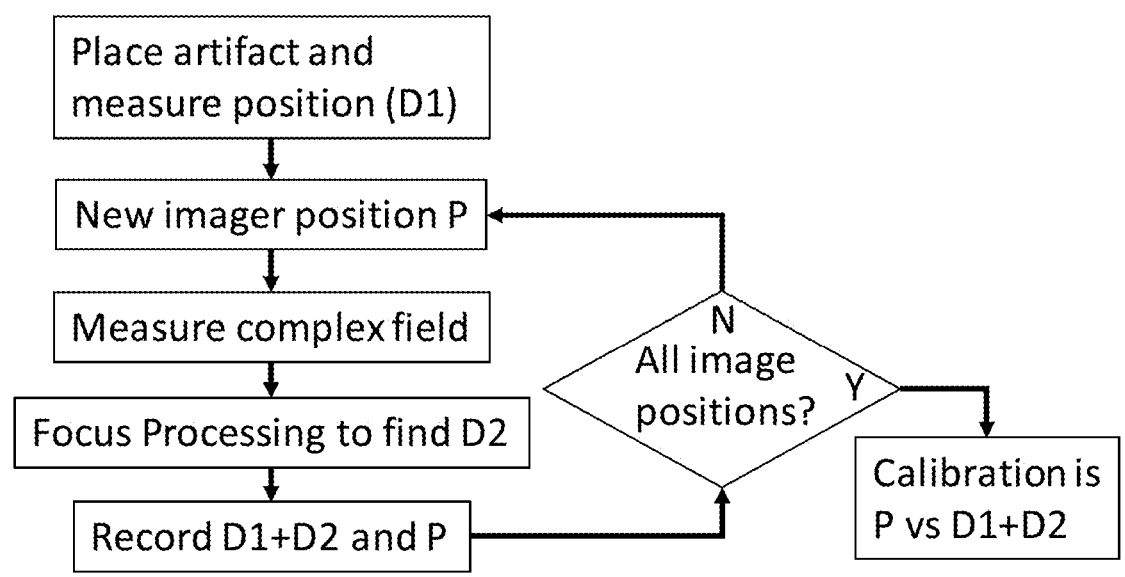
FIG. 6 is a flow chart illustrating calibration of the focus mechanism using object space processing.

With the calibration artifact placed as shown ("Artifact" in FIG. 5), PSI measurements yield the cavity complex field. Assume that both the TF-Artifact cavity length (D1) and the spatial sampling in object space are known, then the distance between the Artifact surface and best focus (D2 in object space) can be obtained by focus processing of the cavity complex field. The object space position D1+D2 is then conjugate to the imaging plane which is located at encoder position P. The focus encoder can be calibrated over the full measurement space by repeating this measurement with the imager (i.e., the camera) placed at different encoder positions. This exemplary procedure is outlined in FIG. 6. Specifically, in this procedure, for each of multiple positions of the camera, the best focus position for the test object is determined by optimizing a merit function based on the ITF derived from the propagated complex field as a function of propagation distance.

Figure 7:
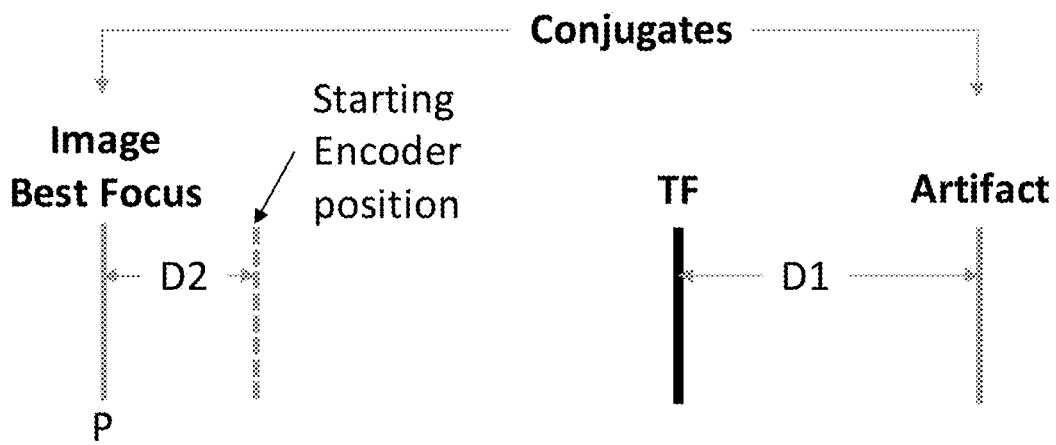
FIG. 7 is a schematic diagram illustrating calibration of the focus mechanism using image space processing.
Figure 8:
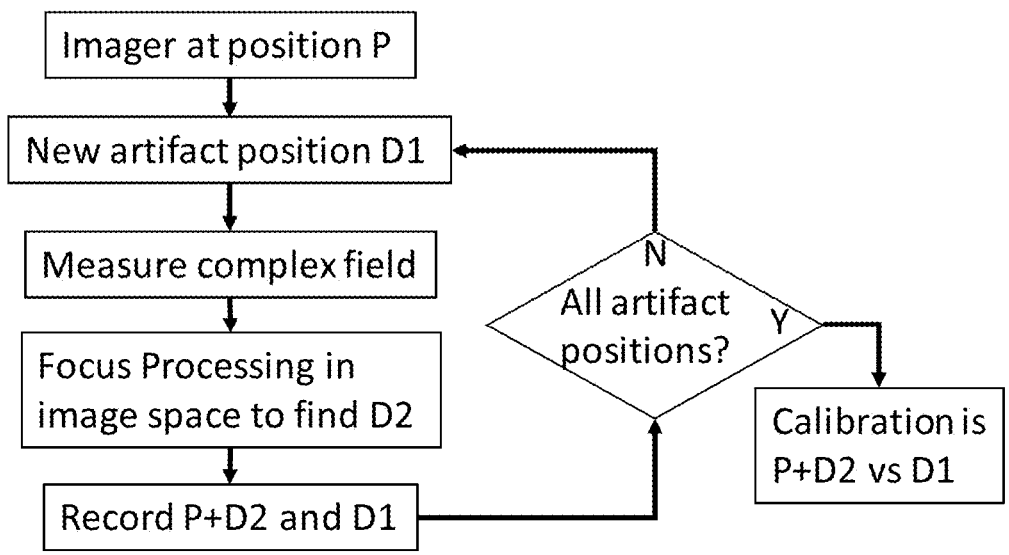
FIG. 8 is a flow chart illustrating calibration of the focus mechanism using image space processing.

Alternatively, the calibration can be performed in image space as shown in FIG. 7. In this case, for each of multiple positions of the test artifact, the best focus position in image space is determined by Focus Processing of the image space complex field. Conversion between object space and image space can usually be based on the measured images according to the known features of the test artifact in object space and the known pixel spacing of the camera in image space. The focus encoder can be calibrated over the full measurement space by repeating this measurement with the Artifact placed at different object space positions. This exemplary procedure is outlined in FIG. 8.

Focus Measuring Mechanism

The calibration technique assumes that the cavity length "D1" between the reference surface and artifact surface, is known. Moreover, applying the calibration and subsequent focus correction to a test object requires knowledge about the cavity length D1. Though there are many possible ways to obtain this information, two options are described in detail.

(1) Direct Measurement of the Cavity Length Using a Ruler or Encoded Stage

A ruler or ruled stage is the simplest option. The cavity length information can then be input to the system manually. Alternatively, encoding the stage upon which the test object is supported and including an optical reader would allow the interferometry system to read the encoder automatically, eliminating the need to manually input the cavity length. For example, this was illustrated in the interferometer of FIG. 1 described above in which positioning device 119 provides z-position information 116 to electronic processor 114 for use in processing the interference images captured by camera 110.

(2) Replacing Mechanical PSI with Wavelength Tuning and FTPSI Processing

In yet further embodiments, instead of mechanical phase-shifting, wavelength-tuning is used to introduce the phase shifts corresponding to the sequence of phase-shifted interference images. Specifically, the light source for the interferometer is a wavelength-tunable laser, and a sequence of interference images is recorded by the camera for a sequence of wavelength shifts to thereby provide an alternative, non-mechanical means to acquire the sequence of phase-shifted interferograms. Such a technique can be referred to as Swept Wavelength PSI ("SWPSI") to distinguish from mechanical PSI. Moreover, Frequency Transform PSI ("FTPSI") analysis techniques can be applied to SWPSI data to accurately determine the cavity length. Furthermore, for test samples that have one or more additional surfaces creating interferometric cavities with each other and the reference surface, FTPSI can extract the cavity lengths for all such cavities. Additionally, SWPSI with FTPSI processing has been demonstrated to provide improved homogeneity measurements and eliminate spatially dependent phase shifts when measuring fast spherical cavities. FTPSI is described in commonly owned U.S. Pat. Nos. 6,882,432, and 6,924,898, the contents of which are incorporated herein by reference in their entirety. For completeness, one embodiment of a SWPSI interferometer implementing FTPSI is described below.

Example of SWPSI Interferometer System and FTPSI Processing

Figure 9:
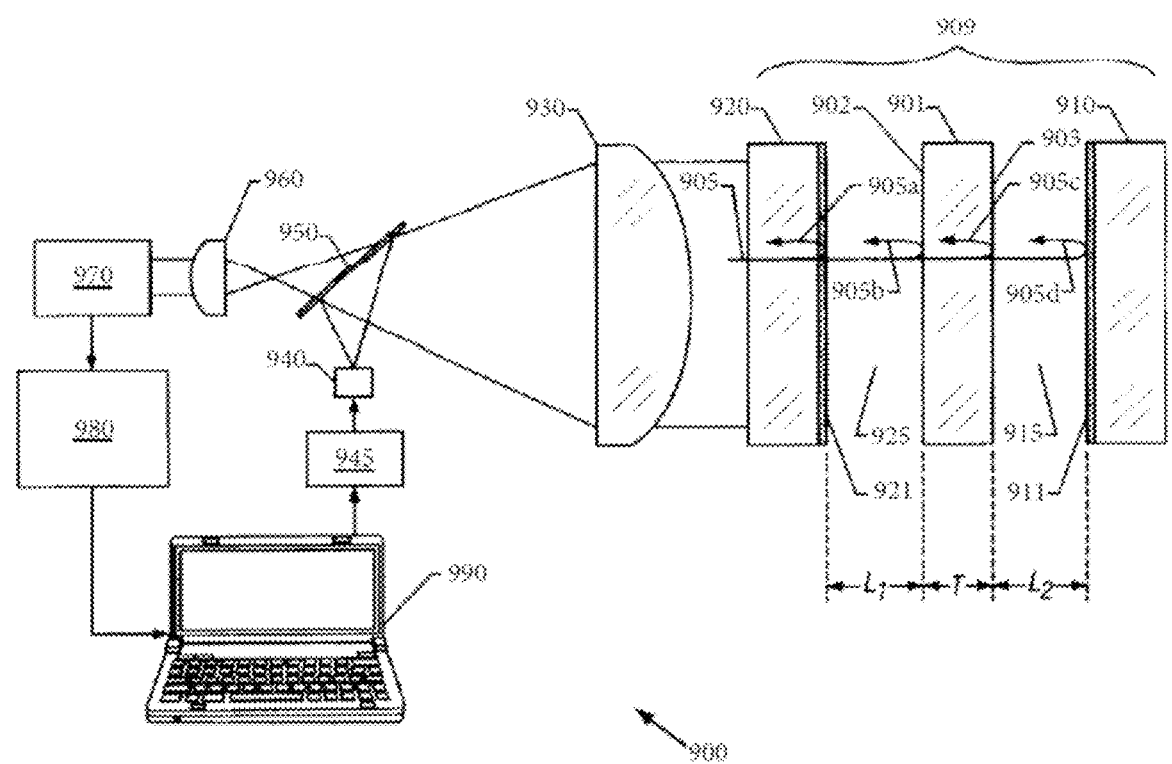
FIG. 9 is a schematic diagram of a scanning wavelength phase-shifting interferometry ("SWPSI") system implementing frequency transform phase-shifting interferometry ("FTPSI").

A schematic diagram of such a SWPSI interferometer system 900 is shown in FIG. 9. System 900 is adapted to measure the optical interference between reflections from the front surface 902 and back surface 903 of a transparent measurement object 901 (e.g., an optical flat. The optical interference measured includes contributions from additional reflections from surfaces 911 and 921 of reference objects 910 and 920, respectively. For example, reference objects 910 and 920 may be reference flats having well-characterized surfaces. Surface 902 is separated from surface 921 by a gap 925, and surface 903 is separated from surface 911 by another gap 915. System 900 includes a mount (not shown) for positioning object 901 relative to reference objects 910 and 920, and a computer 990. System 900 additionally includes a tunable light source 940 (e.g., a laser diode), a driver 945 connected to light source 940 for adjusting the optical frequency of its output, a beam splitter 950, a collimating optic 930, an imaging optic 960, a—camera 970, and a frame grabber 980 for storing images detected by camera 970.

In some embodiments, a single device can perform both control and measurement functions (e.g., frame grabber 980 may be incorporated in computer 990). Driver 945 tunes the optical frequency ν of light source 140, through a frequency range Δν about a nominal optical frequency of $\nu_0$.

During operation, controller 990 causes driver 945 to control the optical frequency of light emitted by light source 940 and causes frame grabber 980 to store an image of the optical interference detected by camera 970 for each of the specified optical frequencies. Frame grabber 980 sends each of the images to controller 990, which analyzes them using a PSI algorithm. In some embodiments, driver 945 linearly modulates the optical frequency of the light source 940 as the series of interference images are being recorded. Alternatively, in other embodiments, the driver can modulate the optical frequency in discrete steps or according to other functions.

During operation, light source 940 directs light having an optical frequency ν to beam splitter 950, which then directs the light to collimating lens 930 to collimate the light into a plane field. Optionally, a second beamsplitter (not shown) directs a portion of the light to an optical frequency monitor. Surface 921 reflects a first portion of the light to form a first reference wavefront 905a, and surfaces 902 and 903 of object 901 reflect additional portions of light to form wavefronts 905b and 905c respectively. Surface 911 also reflects a portion of light to form a second reference wavefront 905d. Lenses 930 and 960 then image wavefronts 905a, 905b, 905c, and 905d onto camera 970 where they form an optical interference pattern. The optical interference pattern also includes contributions from higher order reflections within cavity 909. Higher order reflections include, for example, interference between light reflecting from surface 921 and light that reflects first off surface 902, then by surface 921, and then again by surface 902.

In the analysis that follows, we first consider the optical interference pattern produced by optical frequency tuning in an elemental two-surface interferometer cavity, for example, the cavity formed by surface 921 and surface 902. The surfaces are separated by a physical gap L and contain a medium with a refractive index n. For example, the gap can be filled with air, which has a refractive index of about one. The product of refractive index and gap thickness, nL, is referred to as the optical thickness (for air this is equal to the physical thickness, L). The total phase difference, φ, between light rays with wavenumber k reflected from surface 902 and light rays which reflect from surface 903 p times is given by:

$$\varphi(x, y) = 2pknL(x, y) + \Phi = 2pnL(x, y)\frac{2\pi\nu}{c} + \Phi, \quad (4)$$

where ν is the optical frequency of the light, c is the speed of light, and Φ is an overall constant phase. The x and y dependence of gap L and phase φ are shown explicitly in EQ. 4 to show the spatial variation in phase. In some embodiments, refractive index n may also have an x and y dependence. Extraction of this phase variation profile, or phase map, is the information that is typically of interest in PSI. This explicit x and y dependence will be omitted in the equations that follow for the sake of clarity.

Tuning the source optical frequency, ν, produces an interferometric phase variation, φ̇, that depends on the optical frequency tuning rate, ν̇, and the cavity optical path difference 2 pnL as $$\dot\varphi = \frac{4\pi pnL\dot\nu}{c}, \quad (5)$$

where the dot represents differentiation with respect to time. The cavity interference therefore varies at a frequency $f_C$, which is given by $$f_C = \frac{2pnL\dot\nu}{c}. \quad (6)$$

Accordingly, in an elemental cavity, multiple reflection events produce interference at frequencies that are harmonics of the $1^{st}$ order (i.e., p=1) frequency.

In some embodiments, frequency $f_C$ can be determined from EQ. 6 if nominal values for the optical thickness, nL, and optical frequency tuning rate, ν̇, are known.

In addition, the frequency $f_C$ can be identified by transforming the interference intensity data measured by camera 970 into the frequency domain (e.g., by using a Fourier transform) to produce a frequency spectrum and identifying the frequency of the corresponding peak in the spectrum Once $f_C$ has been determined, and for substantially linear frequency tuning, the interferometric phase of any elemental cavity can be recovered from the complex amplitude of the Discrete Fourier Transform (DFT) of the interference, evaluated at the representative first-order frequency, $f_C$, for that cavity:

$$\varphi = \tan^{-1}\left(\frac{\mathrm{Im}(DFT(f_C))}{\mathrm{Re}(DFT(f_C))}\right), \quad (7)$$

where $$DFT(f_C) = \sum_{j=0}^{N-1} I_j W_j \exp\left[i\frac{2\pi j f_C}{f_S}\right]. \quad (8)$$

In EQ. 8, $I_j$ is the intensity sample measured at the $j^{th}$ optical frequency of the optical frequency tune. N is the total number of intensity samples acquired. $W_j$ are the sampling weights associated with a Fourier window, W, and $f_S$ is the sampling rate. Fourier window, W, is usually selected to suppress contributions to the phase evaluation from additional frequencies far from $f_C$, and from the effect of finite observation intervals. Examples of Fourier windows include Hamming windows and Tukey windows. The Tukey window can be advantageous in embodiments having one or more additional frequency peaks close to $f_C$ as the taper width of the window can be chosen to effectively zero-weight these additional frequencies at $f_C$.

The complex value of $DFT(f_c)$ in EQ. 8 across all of the pixels gives the "complex field" for the wavefront corresponding to the cavity, in analogy to the EQ. 1 for a mechanical PSI analysis. Furthermore, the cavity length D1 corresponds to nL in EQ. 6, which can be calculated from the extracted first order (p=1) frequency $f_c$ and optical frequency tuning rate, $\dot{v}$.

Extraction of the phase, $\varphi$, for each camera pixel gives a phase distribution $\varphi(x, y)$ (i.e., phase map) for the cavity. Variations in optical thickness (i.e., the relative optical thickness) can be determined from EQ. 4. Moreover, for the case where the surface profile of the reference surface 921 is already known, the phase distribution can be used to determine the surface profile of surface 902. It is noted that the results of the phase extraction defined by EQs. 7 and 8 generates phases modulo $2\pi$. These phase ambiguities can be accounted for in the phase map using conventional $2\pi$ phase ambiguity unwrapping techniques, commonly known in the art.

The phase extraction analysis discussed above provides the relative information about the cavity (i.e., variations from pixel to pixel). It is also possible to determine absolute information about the cavity. According to EQ. 6, one can determine the absolute optical thickness nL from the first-order peak frequency $f_C$, and the frequency tuning rate $\dot{v}$. The accuracy of this determination, however, depends on the accuracy with which $f_C$ and $\dot{v}$ can be determined. Moreover, the x and y dependence of the absolute optical thickness nL can be determined by separately identifying the first-order frequency $f_C$ from interference intensity data corresponding to each pixel of camera 970.

In some embodiments, a high-resolution frequency spectrum of a small portion of the cavity (e.g., corresponding to one camera pixel) can be obtained in order to accurately determine $f_C$. From this, an accurate value for the optical thickness of the cavity can be determined for that portion of the cavity. In a separate measurement, a low-resolution frequency spectrum of the entire cavity can be obtained. Using EQ.'s 7 and 8, this information can be used to determine the phase map and optical thickness variation of the cavity. The optical thickness of the entire cavity can then be determined by referencing the variation in optical thickness to the optical thickness determined for the small portion of the cavity. Parameters affecting the frequency spectrum resolution and spectral resolution limit are discussed below.

The analysis above adequately describes the situation where object 901 is opaque, and only the reflections from surface 902 of object 901 need be considered. However, in some embodiments, object 901 is transparent, and reflections from surfaces 921, 902 and 903 should be considered. In the analysis that follows, reflections from surface 911 of reference flat 910 can be ignored. For example, reference flat 910 can be replaced by a non-reflective beam stop. There are now three elemental two-surface cavities corresponding to surface pairs 921 and 902, 921 and 903, and 902 and 903, respectively. Surface 921 and surface 902 are separated by a distance L (i.e., gap 925). In what follows, gap 925 is assumed to be filled with air and have a refractive index equal to one. Object 901 has a thickness T and a refractive index n. Assume that the interferometer is configured so that all elemental cavities have unique OPD's. The $1^{st}$ order frequencies are then spectrally separated and the interferometric phase of any elemental cavity can be extracted using the frequency decomposition and phase extraction given by EQ.'s 7 and 8. Thus, both the relative and absolute optical thickness profiles can be made simultaneously for multiple elemental cavities.

To accurately determine the peak frequency $f_C$ for each cavity (necessary for accurate absolute optical thickness measurements), it is necessary to spectrally resolve each peak of interest. The spectral resolution limit of a Fourier decomposition is inversely proportional to the observation time, hence the minimum resolvable interference frequency is $$f_{min} = \frac{1+\mu}{\Delta t} = \frac{(1+\mu)f_S}{N}. \tag{9}$$

All first order frequencies should be separated by $f_{min}$ to be resolved. The parameter $\mu$ is introduced as a practical matter. The theoretical resolution limit occurs when $\mu=0$, but in practice, the minimum resolvable frequency should be somewhat larger to account for potential instrumental deficiencies and phase error sensitivities.

Setting $f_C = f_{min}$, EQ. 6 implies that the minimum resolvable optical path difference for a tuning range of $\Delta v_{max}$ is given by $$\Gamma = \frac{c(1+\mu)}{\Delta v_{max}}. \tag{10}$$

This turns out to be, for example, 3.75 millimeters for an 80 gigahertz maximum tuning range if $\mu=0$. The primary cavity gaps should be greater than the limits imposed by EQ. 10 in order to separate the first order frequencies. Furthermore, if it is desired to accurately determine the first-order peak frequencies, the tuning range must be larger than that required by EQ. 10.

The analysis methodology adopted can now be summarized: the interferometer cavity is constructed to create a unique OPD for each elemental cavity, thereby assuring unique interference frequencies via EQ. 6. The interferogram is then sampled while the optical frequency is varied. The interferogram recorded at each pixel may then spectrally decomposed with a frequency transform, such as a Fourier transform, and the $1^{st}$ order frequency peaks corresponding to the elemental cavities are identified from the transformed data.

In some embodiments, frequency transforms at the specific $1^{st}$ order frequencies using EQ. 8 are applied to the data to evaluate the phase map (using EQ. 7) of each elemental cavity separately. The phase maps can be used to determine information such as, for example, the surface profile of one or more of the cavity surfaces, and/or the relative optical thickness of one or more of the elemental cavities.

Alternatively, or in addition, the peak frequency values themselves can be used to determine the absolute optical thickness of the corresponding cavity provided the tuning range provides sufficient resolution. Information about the optical thickness and optical thickness variation of each cavity can be combined to determine a complete optical thickness profile of each cavity.

Setting Focus with a Calibrated Focus Mechanism

Figure 10:
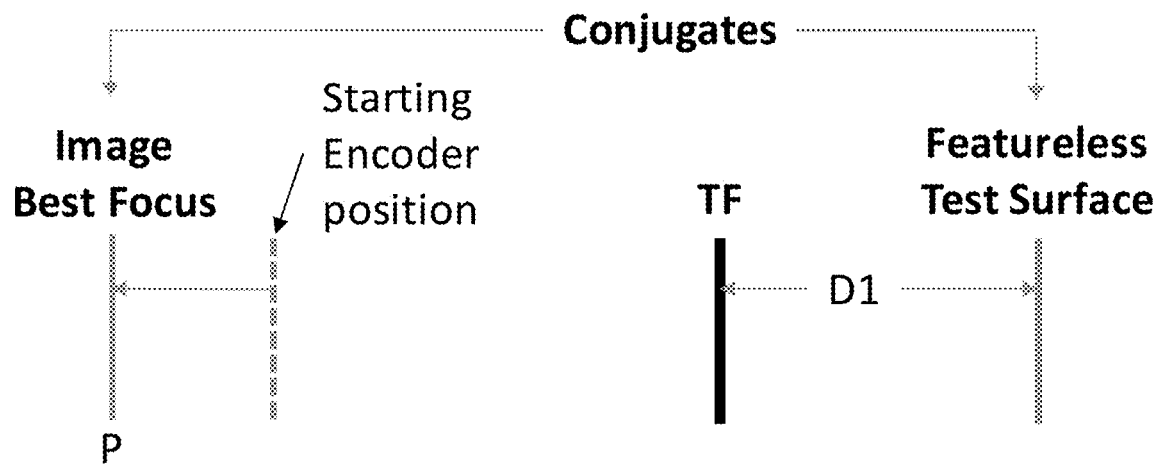
FIG. 10 is a schematic diagram illustrating refocusing using the calibration and the focus mechanism.
Figure 11:
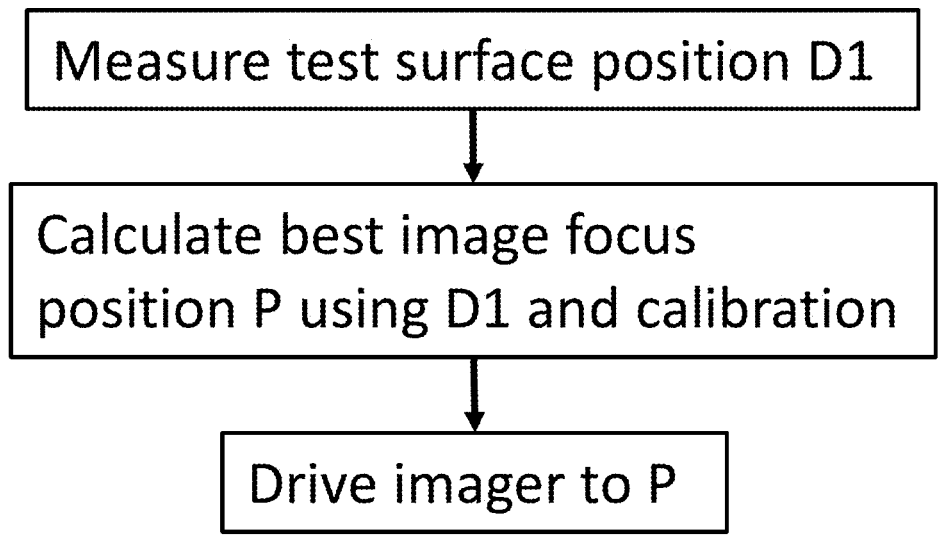
FIG. 11 is a flow chart illustrating refocusing using the calibration and the focus mechanism.

Once the focus mechanism is calibrated, the system can focus on any position for the test object within the calibrated volume, even if the test object is otherwise featureless so that simple observation of the test object on the camera provides no information about relative focus. As depicted in FIG. 10, the test surface of interest is placed in the interferometer and the cavity length D1 is determined (e.g., by manual or automated inspection of encoded stage, or by FTPSI processing for the case of a SWPSI interferometer). Using D1 as the input, an electronic processor that stores the calibration determines the image position P for best focus based on the calibration and causes the focus mechanism to drive the imager (i.e., the camera) to position P to bring the test surface into focus. The system then measures the surface in-focus. The procedure steps are outlined in FIG. 11.

Correcting for Defocus with a Calibrated Focus Mechanism

Figure 12:
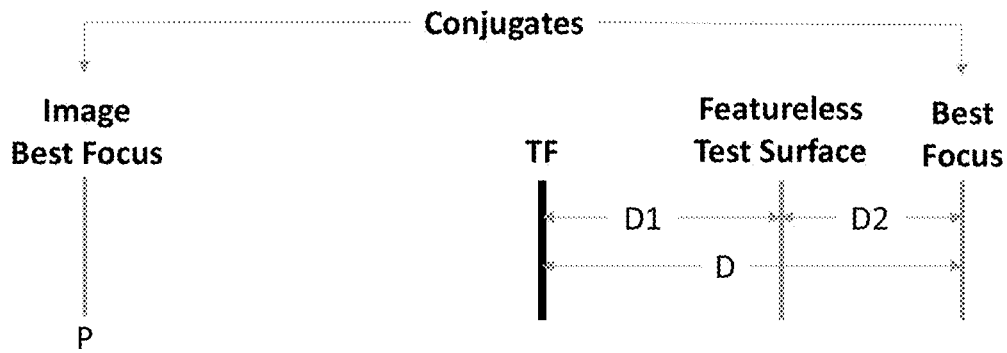
FIG. 12 is a schematic diagram illustrating refocusing using the calibration and digital propagation of the complex field for the cavity wavefront to a best focus position.
Figure 13:
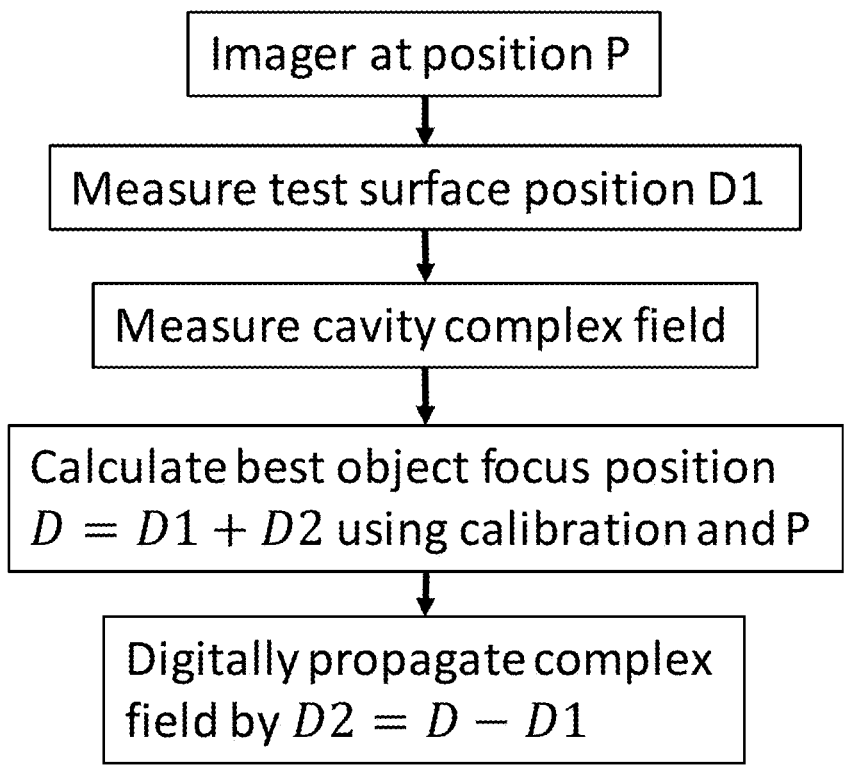
FIG. 13 is a flow chart illustrating refocusing using the calibration and digital propagation of the complex field for the cavity wavefront to a best focus position.

In yet further embodiments, a test surface measured in a defocused condition can be corrected as illustrated FIG. 12. A test surface of interest is placed in the interferometer, the cavity length D1 is determined and a PSI (or FTPSI) measurement obtains the (out-of-focus) complex field. Using D1 and the calibration, the object position for best focus is determined (D1+D2) and the system digitally propagates the complex field a distance D2 to that position using, for example, Fresnel propagation as described above. The test surface phase information is then recovered from the propagated field. The steps of the procedure are outlined in FIG. 13.

Focusing in Multiple Cavity Geometries with SWPSI and FTPSI

The ability of FTPSI to accurately determine multiple cavity lengths for a test object having giving rise to multiple optical cavities is highly relevant to the problem described herein of proper focusing. Specifically, even if one surface of interest is physically in focus, the necessary implication is that one or more other test surfaces of interest are not in focus. By using a SWPSI interferometer and FTPSI, however, the complex field corresponding to one or more cavities can be digitally propagated to a position of best focus so that subsequent phase extraction can be performed with improved lateral resolution enabled by optimal focusing. Note that the reference surface or reference surfaces in the case of the multiple-surface case are assumed to be smooth on the scale of the focus effect.

Figure 14:
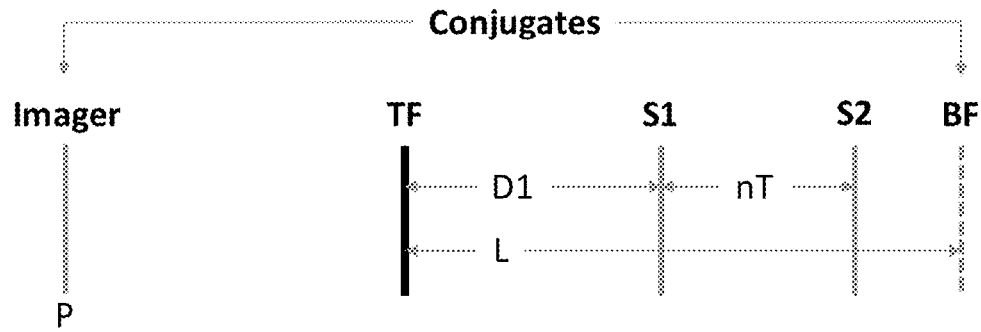
FIG. 14 is a schematic diagram illustrating refocusing in a 3-surface cavity using the calibration and digital propagation of the complex field for each of multiple cavity wavefronts to a best focus position.
Figure 15:
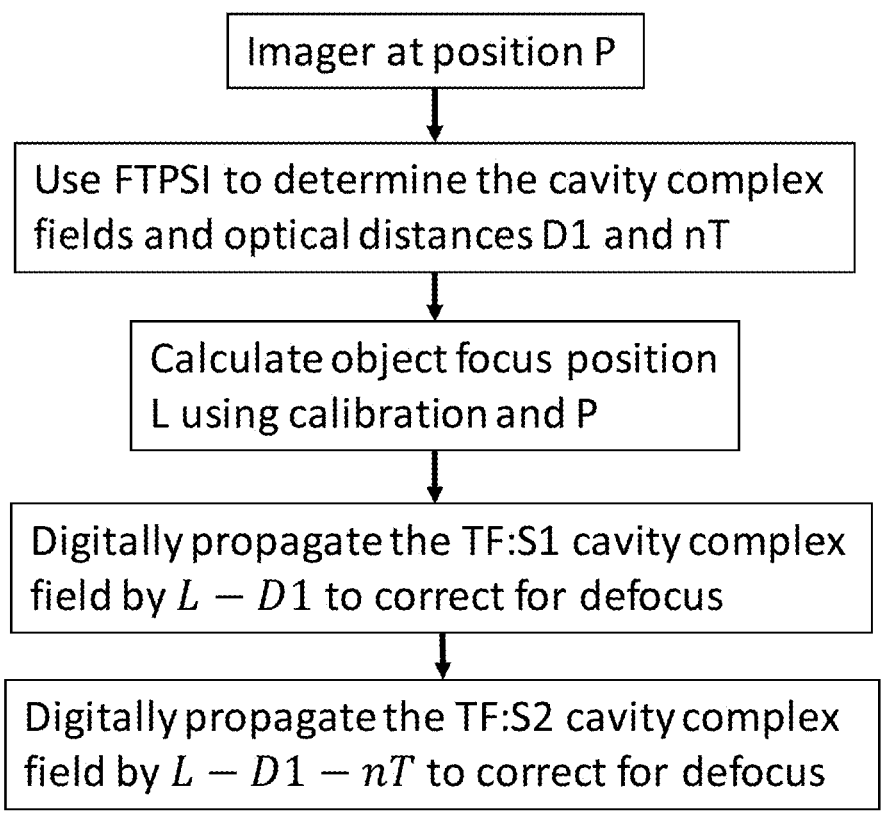
FIG. 15 is a flow chart illustrating refocusing in a 3-surface cavity using the calibration and digital propagation of the complex field for each of multiple cavity wavefronts to a best focus position.

As described above and in the commonly owned U.S. Pat. Nos. 6,882,432, and 6,924,898 referenced above and incorporated herein by reference, SWPSI and FTPSI can be applied to various cavity geometries for measuring parallel optical flats to provide individual measurements for both surfaces of the flat, the optical thickness, physical thickness and homogeneity from a single acquisition. Because the surfaces occupy different positions on the optical axis, it is impossible to have all surfaces in focus simultaneously during the measurement. The techniques described herein can address this problem. Consider the 3-surface Fizeau geometry shown in FIG. 14, used for measuring the front surface S1 and optical thickness of the flat nT (the physical thickness T times the optical index n). The imager is positioned at some point labelled P and the conjugate focus position determined from the focus mechanism calibration is then BF. The distance from the TF to BF (L) is determined from P and the focus mechanism calibration, while distances D1 and nT are found by FTSPI processing or some other means. The complex field from the TF:S1 cavity is digitally propagated a distance L−D1 to refocus the S1 surface while the TF:S2 cavity field is digitally propagated a distance L−D1−nT to refocus the S2 surface. The steps of the procedure are outlined in FIG. 15.

As the illumination wavefront passes through the test flat, it is modified by the surfaces and index inhomogeneity. The wavefront further diffracts as it propagates downstream. When correcting surfaces downstream of the test flat (like the S2 surface) for defocus, the effectiveness of the method just described will depend on the spatial frequency content of the test flat contributions to the illumination wavefront. If the wavefront contributions from the test flat have small enough spatial frequency content so that diffraction changes are small, then the defocus correction will be effective. Otherwise errors due to the evolving wavefront can occur.

Figure 16:
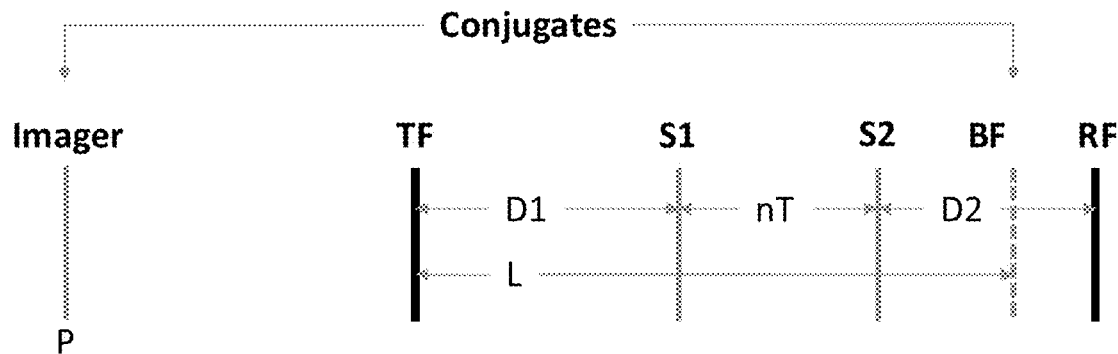
FIG. 16 is a schematic diagram illustrating refocusing in a 4-surface cavity using the calibration and digital propagation of the complex field for each of multiple cavity wavefronts to a best focus position.
Figure 17:
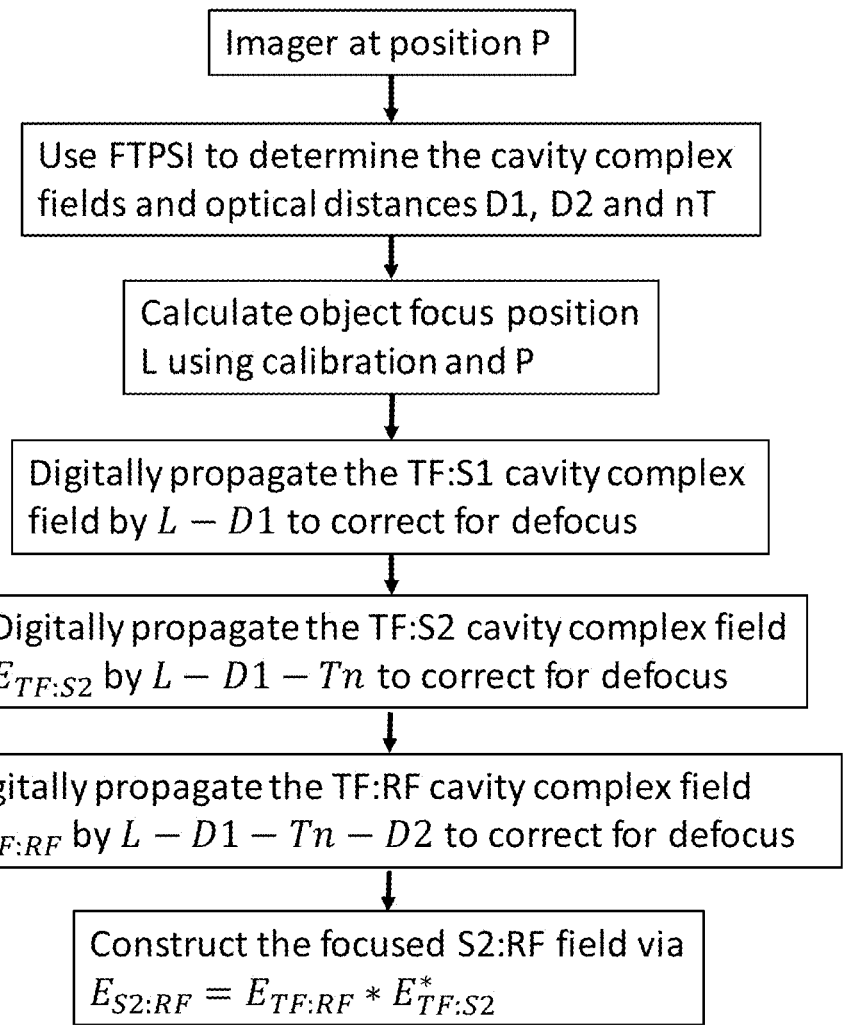
FIG. 17 is a flow chart illustrating refocusing in a 4-surface cavity using the calibration and digital propagation of the complex field for each of multiple cavity wavefronts to a best focus position.

In yet another embodiment, a 4-surface Fizeau geometry shown in FIG. 16 is used for measuring both surfaces S1 and S2, the physical and optical thickness and homogeneity of an optical flat (when combined with an empty cavity measurement). For example, let the imager be positioned at some point P whose conjugate focus position determined from the focus mechanism calibration is BF. The distance L from the TF to BF is determined from P and the focus mechanism calibration, while D1, D2 and nT are found by FTSPI processing. The complex field from the TF:S1 cavity is digitally propagated a distance L−D1 to refocus the S1 surface. The complex field computed directly from the S2:RF Fourier peak is not referenced to the TF. To properly refocus the S2:RF cavity, the construction S2:RF=TF:RF−TF:S2 is used and each of the TF:X cavities are refocused separately since they are referenced to the TF. The complex field from the TF:S2 cavity field is digitally propagated a distance L−D1−Tn to refocus the S2 surface and the complex field from the TF:RF cavity field is digitally propagated a distance L−D1−Tn−D2 to refocus the RF surface. The two surfaces obtained from each refocused field are then subtracted to get the focused surface from the S2:RF cavity. Alternatively and equivalently the surface can be obtained from the product of one field with the conjugate of the other. As mentioned before, the RF:S2 cavity defocus correction will be sensitive to the contributions the test flat makes to the illumination wavefront. The steps of the procedure are outlined in FIG. 17.

Scope

The focus correction techniques described herein can be applied many different types of interferometers. For example, the interferometer can be any of the following types: Fizeau, Twyman-Green, Mirau, Linnik, Michelson, Shearing or any other of the common types of interferometers for cross-sectional profiles or full 3D imaging of surfaces or wavefronts. Also, the focus correction described herein is independent of the type of measurement employed by the interferometer, whether for surface form, waviness, roughness, etc. Furthermore, the focus correction can be applied to interferometers independent of source wavelength or coherence properties, as long as interference between the surface under test and a reference is observed. Moreover, especially when using SWPSI and FTPSI, the focus correction can be applied to measurements involving any number of surfaces or cavities as long as the appropriate optical distances are measured or otherwise determined.

The features of the data processing element can be implemented in digital electronic circuitry, or in computer hardware, firmware, or in combinations of these. The features can be implemented in a computer program product tangibly embodied in an information carrier, e.g., in a machine-readable storage device, for execution by a programmable processor; and features can be performed by a programmable processor executing a program of instructions to perform functions of the described implementations by operating on input data and generating output. The described features can be implemented in one or more computer programs that are executable on a programmable system including at least one programmable processor coupled to receive data and instructions from, and to transmit data and instructions to, a data storage system, at least one input device, and at least one output device. A computer program includes a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors one of multiple processors of any kind of computer. Generally, a processor will receive instructions and data from a read-only memory or a random access memory or both. Computers include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube), LCD (liquid crystal display) monitor, e-Ink display or another type of display for displaying information to the user and a keyboard and a pointing device such as a mouse or a trackball by which the user can provide input to the computer.

While this specification contains many specific implementation details, these should not be construed as limitations on the scope of any inventions or of what may be claimed, but rather as descriptions of features specific to particular embodiments of particular inventions.

Certain features that are described in this specification in the context of separate embodiments can also be implemented in combination in a single embodiment. Conversely, various features that are described in the context of a single embodiment can also be implemented in multiple embodiments separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of embodiments of the invention have been described. Nevertheless, it will be understood that various modifications may be made without departing from the spirit and scope of the invention. Accordingly, other embodiments are within the scope of the following claims.

What is claimed is:

1. A method for measuring a property of a test object with an interferometer, the method comprising:
    a. providing calibration information relating a focus setting for the interferometer to a position of the test object, wherein the position of the test object is relative to a reference surface of the interferometer;
    b. determining the position of the test object relative to the reference surface; and
    c. using the interferometer to collect interferometric images of the test object for use in measuring the property of the test object;
    d. wherein the method further comprises at least one of the following:
        i. prior to collecting at least some of the interferometric images, adjusting a focus of the interferometer in hardware based on the calibration information and the determined position of the test object relative to the reference surface to improve a degree of focus of the interferometric images; and
        ii. using one or more electronic processors to mathematically propagate at least one wavefront derived from the interferometric images based on the calibration information and the determined position of the test object relative to the reference surface to improve a degree of focus of the wavefront derived from the interferometric images.

2. The method of claim 1, wherein the interferometer comprises a ruled stage for supporting the test object and wherein determining the position of the test object relative to the reference surface comprises manually or automatically reading the ruled stage.

3. The method of claim 1, wherein the interferometer comprises a light source having a variable wavelength, wherein the interferometric images are collected while adjusting the wavelength of the light source, and wherein the position of the test object relative to the reference is determined based on the interferometric images collected while adjusting the wavelength of the light source.

4. The method of claim 1, wherein the method comprises the adjusting of the interferometer in hardware to improve the degree of focus of the interferometric images, and wherein the adjustment comprises a mechanical, optical, or electro-optical adjustment to the focus of the interferometer to improve the degree of focus of the interferometric images.

5. The method of claim 4, wherein the interferometer comprises a detector used to detect the interferometric images, and wherein the adjustment comprises an adjustment to a position of the detector or an adjustment to a focus optic upstream of the detector.

6. The method of claim 1, the method comprises the mathematical propagation of the wavefront derived from the interferometric images based on the calibration information and the determined position of the test object relative to the reference to improve the focus of the wavefront, and wherein the measurement of the property of the test object is determined based on the propagated wavefront.

7. The method of claim 1, wherein the measured property of the test object comprises a surface topography, a thickness profile, or a material uniformity profile.

8. The method of claim 7, wherein the measured property of the test object comprises a thickness profile or a material uniformity profile, and wherein the method further comprises mathematically propagating at least one other wavefront derived from the interferometric images.

9. The method of claim 1, wherein the focus setting is a position of best-focus for an image of the object produced by the interferometer.

10. The method of claim 1, further comprising determining the calibration information.

11. The method of claim 10, wherein determining the calibration information comprises:
   a. using the interferometer to collect interferometric images of an artifact object having known surface features for each of different positions of the artifact object relative to the reference surface; and
   b. for each of the different positions of the artifact object, using one or more electronic processors to mathematically propagate a wavefront derived from the interferometric images to determine a position of best-focus for an image of the artifact object produced by the interferometer.

12. An interferometric system for measuring a property of a test object, the system comprising:
   a. an interferometer for collecting interferometric images of the test object;
   b. one or more electronic processors coupled to the interferometer for analyzing the collected interferometric images, wherein the one or more electronic processors are configured to store calibration information relating a focus setting for the interferometer to a position of the test object, wherein the position of the test object is relative to a reference surface of the interferometer,
   c. wherein the one or more electronic processors are configured to do at least one of the following:
      i. prior to collecting at least some of the interferometric images, cause an adjustment to hardware of the interferometer to improve a degree of focus of the interferometric images based on the calibration information and information for the position of the test object relative to the reference surface; and
      i. mathematically propagate at least one wavefront derived from the interferometric images based on the calibration information and the information for the position of the test object relative to the reference surface to improve a focus of the wavefront derived from the interferometric images.

13. The system of claim 12, wherein the interferometer comprises a ruled stage for supporting the test object and a reader for reading the position of the test object relative to the reference surface, and wherein the reader provides the information for the position of the test object relative to the reference surface to the one or more electronic processors.

14. The system of claim 12, wherein the interferometer comprises a light source having a variable wavelength, wherein the interferometer is configured to collect the interferometric images while adjusting the wavelength of the light source, and wherein the one or more electronic processors are configured to determine the information for the position of the test object relative to the reference surface based on the interferometric images collected while adjusting the wavelength of the light source.

15. The system of claim 12, wherein the electronic processors are configured to cause the adjustment to hardware of the interferometer to improve the focus of the interferometric images based on the calibration information and the information for the position of the test object relative to the reference surface, and wherein the hardware adjustment comprises a mechanical, optical, or electro-optical adjustment to the reference surface to improve the degree of focus of the interferometric images.

16. The system of claim 15, wherein the interferometer comprises a detector used to detect the interferometric images, and wherein the hardware adjustment comprises an adjustment to a position of the detector.

17. The system of claim 12, wherein the one or more electronic processors are configured to mathematically propagate the at least one wavefront derived from the interferometric images based on the calibration information and the information for the position of the test object relative to the reference surface to improve the degree of focus of the wavefront derived from the interferometric images, and wherein the one or more electronic processors are further configured to determine the property of the test object based on the propagated wavefront.

18. The system of claim 12, wherein the measured property of the test object comprises a surface topography, a thickness profile, or a material uniformity profile.

19. The system of claim 18, wherein the measured property of the test object comprises a thickness profile or a material uniformity profile, and wherein the one or more electronic processor are further configured to mathematically propagate at least one other wavefront derived from the interferometric images.

20. The system of claim 12, wherein the focus setting is a position of best-focus for an image of the object produced by the interferometer.

\* \* \* \* \*

UNITED STATES PATENT AND TRADEMARK OFFICE
CERTIFICATE OF CORRECTION

PATENT NO.        : 10,890,428 B2
APPLICATION NO.   : 15/806615
DATED             : January 12, 2021
INVENTOR(S)       : Leslie L. Deck Page 1 of 1

It is certified that error appears in the above-identified patent and that said Letters Patent is hereby corrected as shown below:

In the Claims

Column 21
Line 50 (Approx.), in Claim 12, delete "i." and insert -- ii. --

Signed and Sealed this
Twenty-third Day of March, 2021

Drew Hirshfeld
*Performing the Functions and Duties of the
Under Secretary of Commerce for Intellectual Property and
Director of the United States Patent and Trademark Office*